US005742034A

United States Patent [19]

Meeker

[11] Patent Number: 5,742,034

[45] Date of Patent: Apr. 21, 1998

[54] DIGITAL DEPOSIT VALIDATING SAFE

[75] Inventor: Scott H. Meeker, Temecula, Calif.

[73] Assignee: Phelps-Tointon, Inc., Vista, Calif.

[21] Appl. No.: 588,712

[22] Filed: Jan. 19, 1996

Related U.S. Application Data

[63] Continuation-in-part of Ser. No. 543,477, Oct. 16, 1995.

[51] Int. Cl.[6] .................... G06F 17/00

[52] U.S. Cl. .................... 235/375; 235/379; 235/380; 902/26; 902/27

[58] Field of Search .................... 235/375, 380, 235/379, 385; 902/25, 26, 27

[56] References Cited

U.S. PATENT DOCUMENTS

| | | | |
|---|---|---|---|
| 1,506,491 | 8/1924 | Kline . | |
| 2,508,159 | 5/1950 | Haas . | |
| 2,923,587 | 2/1960 | Zipf | 346/122 |
| 3,593,881 | 7/1971 | Paap | 221/3 |
| 3,648,020 | 3/1972 | Tateisi et al. | 235/61.7 |
| 3,963,900 | 6/1976 | Sawaguchi et al. | 235/61.7 |
| 4,313,601 | 2/1982 | Graef et al. | 271/207 |
| 4,418,555 | 12/1983 | Uyeda | 70/366 |
| 4,447,714 | 5/1984 | Lundblad | 235/379 |
| 4,554,444 | 11/1985 | Hirose | 235/379 |
| 4,663,621 | 5/1987 | Field et al. | 340/825.31 |
| 4,745,784 | 5/1988 | Gartner | 70/277 |
| 4,877,235 | 10/1989 | Robinson et al. | 271/279 |
| 4,899,562 | 2/1990 | Gartner et al. | 70/277 |
| 4,922,837 | 5/1990 | McGunn | 109/46 |
| 5,110,009 | 5/1992 | Gartner et al. | 221/266 |
| 5,220,157 | 6/1993 | Martin et al. | 235/379 |
| 5,340,967 | 8/1994 | Martin et al. | 235/379 |

FOREIGN PATENT DOCUMENTS 2217073 10/1989 United Kingdom .

OTHER PUBLICATIONS

Tidel Engineering, Inc., Carrollton, Texas, "Still Taking Chances With Your Cash Management", TACC Cash Deposit and Dispensing Safe (Referenced in Martin patents '157 and '967) Author, Month, and Year Missing.

Armor Safe Technologies[1] "The Treasury Digial Deposit and Dispensing Safe", Copyright 1993 No Month.

Armor Safe Technologies[1] "Posicache Digital Deposit and Dispensing Safe", Copyright 1994 No Month.

Armor Safe Technologies[1] "ChangeBank Digital Dispensing Safe", Copyright 1993 No Month.

Centurion Deposit Corp., "TSBD 2018 Multi 'Shutter Slot' Depository", 1986 No Month.

*Primary Examiner*—Donald T. Hajec
*Assistant Examiner*—Michael G. Lee
*Attorney, Agent, or Firm*—Juettner Pyle Lloyd & Piontek

[57] ABSTRACT

A paper currency deposit and validating safe includes a generally box like housing having walls forming a chamber comprising a safe for securing money, bill receiving apparatus on the housing for receiving and validating bills of various denominations and for generating a signal proportionate to the denomination of each validated bill, data input port and data output port on the housing, and an electronic cash control system mounted within the safe and including software for recording and storing each deposit into the bill receiving apparatus, each access into the safe and each removal of bills from the bill receiving apparatus and for providing accountings of all such transactions.

9 Claims, 3 Drawing Sheets

FIG. 1
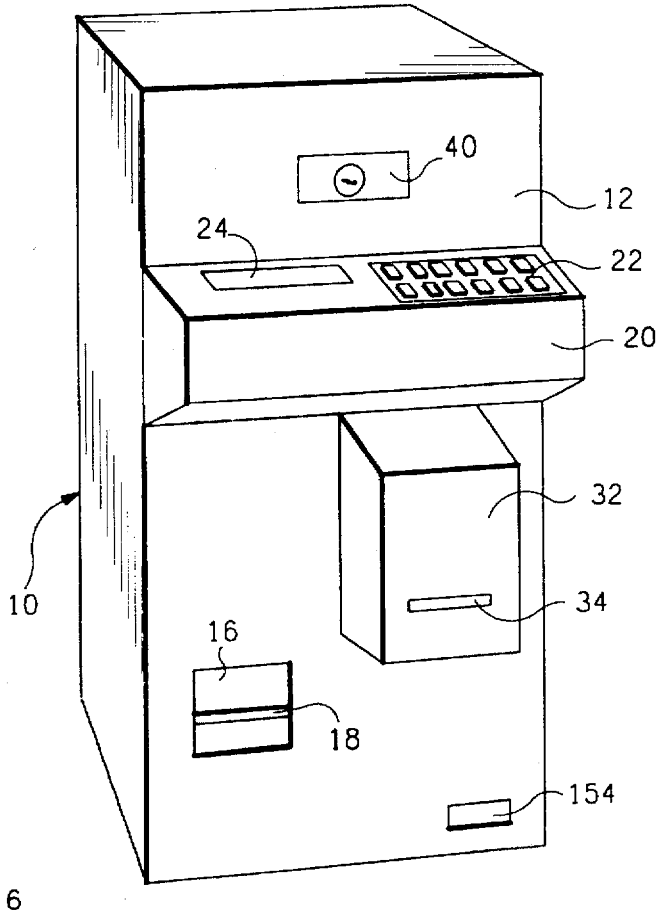
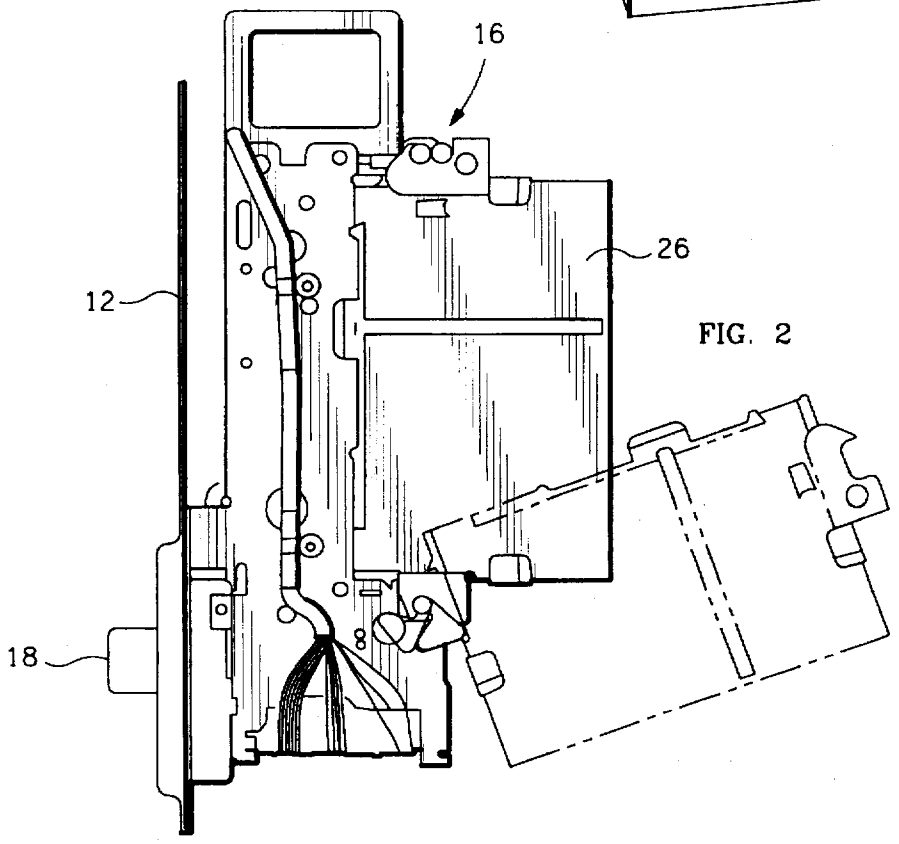
FIG. 2

DIGITAL DEPOSIT VALIDATING SAFE

CROSS REFERENCE

This application is a continuation-in-part of copending application Ser. No. 08/543,477, filed Oct. 16, 1995.

FIELD OF THE INVENTION

The present invention relates to money receiving and safekeeping apparatus and pertains particularly to a cash deposit safe incorporating bill reader and accounting systems.

BACKGROUND

Business establishments which handle a large number of cash transactions accumulate at each cash register significant sums of money. Accumulated cash in the form of bills are periodically transferred to a safe to reduce the risk in the event of robbery. In each instance, a responsible person such as a manager or head cashier must be available to access the safe and accept and identify the deposit.

Deposit systems have recently been developed. However, these systems do not have the ability to receive cash and accurately and fully account for the cash deposited and dispensed. Many of these systems also fail to provide adequate security to prevent embezzlement or theft of funds.

Therefore, there is a need for a reliable and effective cash deposit system for receiving, safekeeping, and accounting for paper currency accumulated in the course of business.

SUMMARY OF THE INVENTION

It is the primary object of the present invention to provide a reliable and effective cash deposit system for receiving, safekeeping, and accounting for paper currency.

In accordance with one aspect of the present invention, a money deposit safe comprises a generally box-like housing having walls defining a safe chamber for securing money, a bill receiving unit mounted on the housing and having means for receiving and validating bills of various denominations and generating a signal in proportion to the denomination of each validated bill, and an electronic accounting system contained within the safe for receiving and processing each said signal and generating accounting data files from the same.

In accordance with a further aspect of the invention, the above-described money deposit safe is equipped with means to enable a number of individually identified persons to deposit money into and/or to access the interior of the safe and to provide an accounting by individual, by transaction and by total transactions of the money deposited into and withdrawn or removed from the safe.

Yet another feature of the invention is to enable convenient access to and retrieval of the accounting data by individual and/or in total, in a variety of customary or desired formats.

BRIEF DESCRIPTION OF THE DRAWINGS

The above and other objects, advantages and features of the present invention will become apparent from the following description when read in conjunction with the accompanying drawings, wherein:

FIG. 1 is a perspective view illustrating a preferred embodiment of the deposit and validating safe of the present invention;

FIG. 2 is a side elevation view of the bill receiving and validating unit incorporated in the preferred embodiment;

DETAILED DESCRIPTION OF THE PREFERRED EMBODIMENTS

Figure 3:
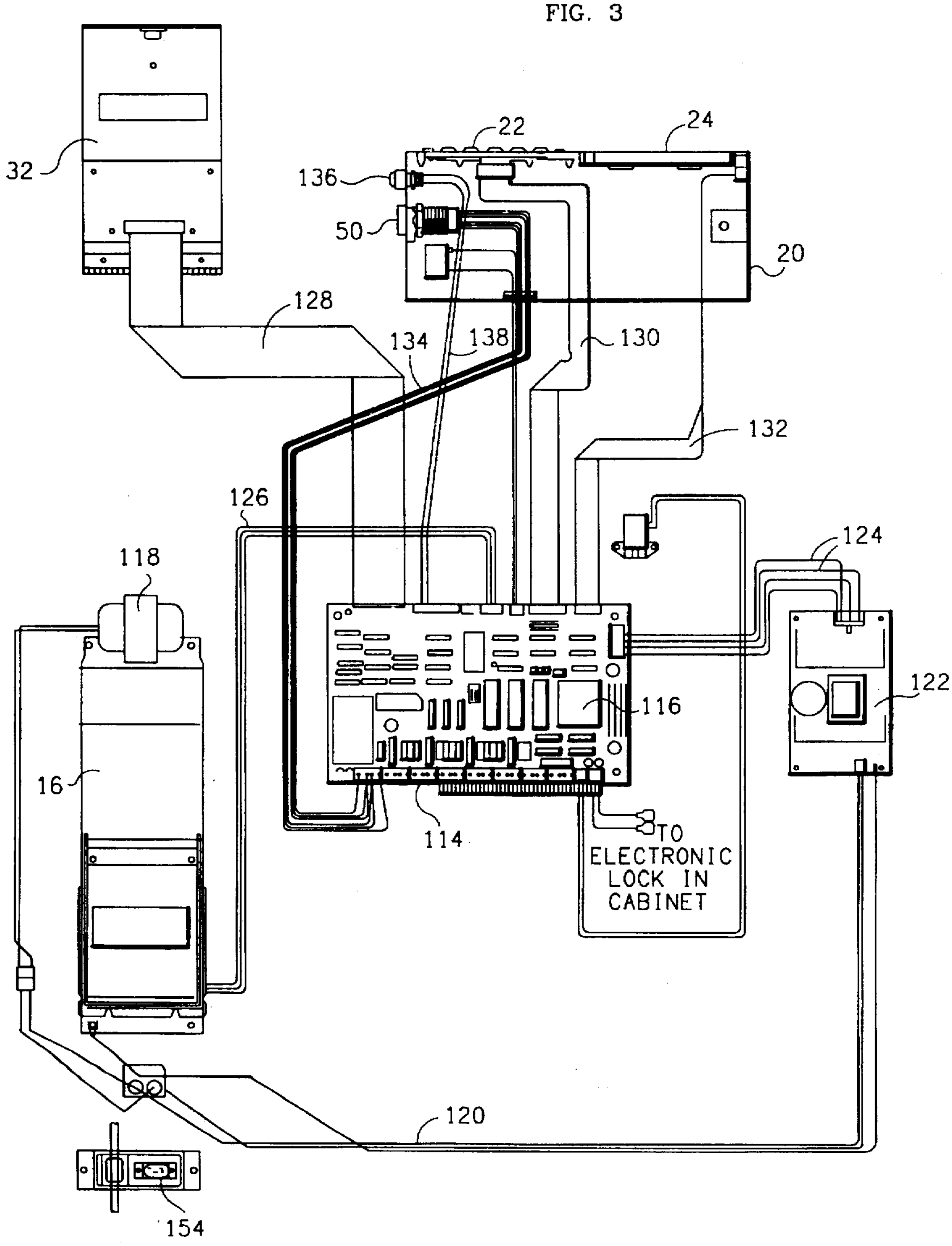
FIG. 3 is a rear elevation view illustrating the major components, and the wiring diagram that connects the major components, of the preferred embodiment.

Referring to FIG. 1 of the drawing, a safe embodying a cash deposit and accounting system in accordance with the present invention is illustrated and designated generally by the numeral 10. The safe comprises a generally box-like housing having front, back, side, top and bottom walls forming or defining a secure chamber for safe storage and placement of cash and other securities. The safe in accordance with the invention is equipped with a system having a combination of functions defining a cash management system to enable the safe storage and retrieval of cash for a retail establishment. The illustrated embodiment has a front wall 12 comprising a door which pivots along an axis at the lower edge thereof to open outward.

The system embodies at least one cash receiving device, along with a central processing unit (CPU) with software for accounting purposes. In the illustrated embodiment, a paper currency receiving and validating unit 16 is mounted on the inside of the door within the safe and is accessible by way of a bill receiving slot 18 in the front of the door. The bill or paper currency receiving and validating unit is preferably an off the shelf item available from Rowe International Inc. in Rockwell, Tex. under the model number RBA-7, which model is designed to read and validate all denominations of U.S. paper currency up to $100.00. The unit accepts a bill and verifies it as a genuine bill, or rejects it. If the bill is accepted, it is read for its denomination and stashed in a storage box, and a signal pulse emitting a credit valuation proportionate to the denomination of the validated bill is initiated. This credit pulse is transmitted to a programmed CPU mounted on a circuit board within the safe which processes the signal.

A user interface and control panel 20 is mounted on the front of the door and includes a key-pad 22 and LCD screen 24. The keypad comprises a digital input device which enables the programming of the CPU and the entry of codes and commands by individual users. The electronic system provides information and prompts the user on the LCD screen how to proceed.

Customarily, the initial prompt instructs the user to input via the keypad 22 a personal identification number or PIN. This activates the bill receiving unit 16 for receipt of bills from the identified user. Each bill inserted into the slot 18 is moved into the unit by an internal transport and monitored by optical and magnetic sensors. If validated, the bill is pushed into and neatly stacked within a bill box.

As shown in FIG. 2, the unit 16 is mounted on the interior surface or rear face of the safe door 12 and includes a bill box 26 which is movable from a bill receiving position, shown in solid lines, to a position for removal of the box from the unit 16, as shown in dotted lines. The bill box is replaceable as a unit so that an empty box may be substituted for a full or partially full box and the latter transported, e.g., by a security service, to a safe place for removal of the bills from the box. Also, tamper proof bill boxes may be provided which can be accessed only by bank or security service personnel. In this instance, the bill box 26 constitutes a safe within a safe.

A printer 32 is mounted on the from of the door 12 and connected through the electronics of the system to print reports on paper dispensed through a slot 34. The printer may be any suitable printer such as a Citizens model number MD-910. The printer may be used to print any number of reports desired by the safe operator. The CPU may be programmed to provide desired accounting information via the printer.

The door 12 is pivotally mounted, such as by means of a pivot pins at opposite sides of the lower edge thereof, and pivots forward to provide access to the interior of the safe. A locking system operated by an exterior control 40 is connected through the door to operate locking bolts to lock the door in a closed position. The construction of the safe and its locking system are essentially conventional and are illustrated in detail in the above-identified parent application. The exterior door control 40 may be a manually operated handle, or an electronically controlled key and key pad actuated lock. The safe is customarily maintained in the locked stage or condition and may be opened only by authorized personnel upon entering a proper code on the keypad 22 which unlocks a solenoid lock to enable operation of the bolt releasing control 40. A back-up manual key unlocking system 50 on the user interface panel (FIG. 3) enables the opening of the safe should a power failure occur. This back-up system is powered by a suitable dry cell battery associated with a circuit board in the interior of the safe.

Referring to FIG. 3, a wiring diagram for one embodiment of the cash control system is illustrated. This system includes a centrally mounted PC board 114 which has a CPU 116 such as an 8088 microprocessor available from Intel or any other suitable unit. The PC board mounts the usual electronics components for interfacing with the CPU for operating the various components of the system. The bill validating unit 16 has its own transformer 118 and is connected through a plurality of conductors 120 to the input terminals of a power supply unit 122. A series of cables 124 connects the output of the power supply unit 122 to the PC board. The bill validating unit 16 is connected to the PC board by suitable conductors 126. A ribbon cable 128 connects the PC board 114 to the printer 32. A ribbon cable of multiple conductors 130 connects the key pad 22 to the PC board. Similarly, the LCD 24 is connected by a ribbon cable 132 to the PC board. The key lock 50 of the power failure back-up system is connected to the circuit board by conductors 134. A printer reset button 136 is coupled to the board via conductors 138.

Figure 4:
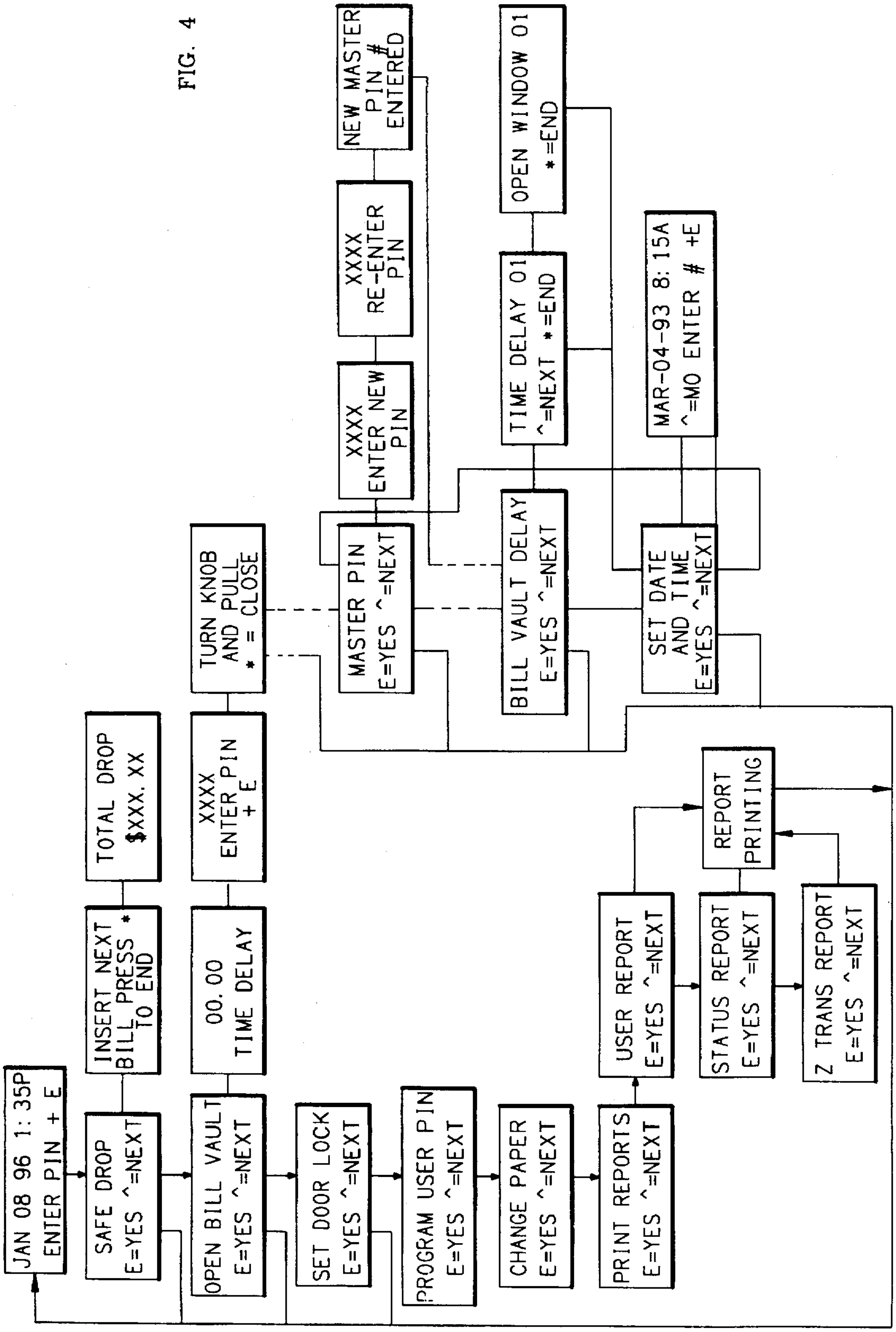
FIG. 4 is a functional block diagram of the preferred embodiment.

The system flow diagram of FIG. 4 illustrates the overall function and operation of a currency controller operating system. The system can be programmed to operate in a number of different ways to suit the operator. However, the safe of the invention is particularly designed and specifically intended to provide a convenient collection and safekeeping system, especially for large retail outlets.

Each person authorized to use the safe is provided with a distinctive PIN number for entry via the keyboard 22. The PIN number will identify the user and the extent of the user's authority, i.e., to deposit only, or to have complete access to the safe. Alternatively, or in addition, a Smart Card may be utilized for identification and authorization.

Each time the deposit system is used, the CPU and associated software process a transaction report which is stored in memory. If desired, a printed report of each individual transaction may be obtained from the printer 32 by following appropriate prompts appearing on the LCD screen 24. The report will customarily identify the user, the date, the time and the nature and amount of the transaction, i.e., the amount deposited by a user, a supervisor's access to the safe, tampering with the validator or removal of the bill box and/or removal and replacement of the bill box. Transaction numbers in sequence may also be provided. At any time desired, a print out can be obtained of total deposits and/or deposits by bill denominations. Periodically, usually at the end of a shift or at day's end, reports can be obtained via the printer of the entire day's transactions, with cumulative totals, and of the shift or day's transactions by individual user. Thus, the business operator is saved the tedious task of hand counting the bills and bill totals, and can simply deliver the bills or the bill box or boxes to the bank where the count will be verified. Preferably, the system is programmed to automatically process a "Z" or zero report at the end of each day to insure against the loss of any data.

Also in the preferred embodiment, the system includes an RS-232 or RS-485 input/output communication port or jack 154 coupled to the PC board so that the system can be interfaced with an accounting system or computer for convenient determination of status and preparation of reports. Each of a plurality of the safes can thus be interfaced with the office of the chief cashier or financial officer for supervision and control.

In addition, the illustrated PC board 114, CPU 116 and associated software have the capacity to serve and process data from a plurality of bill receiving and validating units 16. Consequently, economy models of the safe (i.e., comprised of just a safe and a unit 16, without a PC board and printer) can be placed at various locations throughout a retail establishment and coupled to the above-described "intelligent" safe for processing of data by bill receiving unit and by totals. This will encourage individual clerk/cashiers to deposit currency, especially large bills, frequently rather than letting the large bills accumulate needlessly and at risk in the cash register.

The system further provides for dual security in that it not only supervises and accounts for user transactions, but also supervises and accounts for the transactions of the individual or individuals who remove the bill boxes and the bills from the validator(s) 16. The cash control system is therefore essentially fail-safe.

The system is capable of being programmed for various cash control functions including total cash deposit control with all transactions recorded, retrievable and supported with receipts. Various adjustable time delays can be incorporated for security purposes. Also, and in particular, the system can generate via the printer 32 and/or the communication port 154 any one or more of the following reports: An audit trail, bill deposits by user, bill deposits by denomination, total deposits, bill removal by individual, chronological transactions by user, total transactions chronologically or otherwise, end of shift examine or "x" reports by individual user, zero or "z" reports, and end of the day balancing reports.

The features, objects and advantages of the invention have thus been shown to be attained in a convenient, economical, practical and facile manner.

While preferred embodiments of the invention have been herein illustrated and described, it is to be understood that various changes, rearrangements and modifications maybe made therein without departing from the spirit and the scope of the invention as defined by the appended claims.

What is claimed is:

1. A paper currency deposit and validating system comprising a plurality of safes each comprising a generally box-like housing having walls forming a chamber comprising a safe for securing money, one of said safes comprising an intelligent safe and the remainder of said safes comprising economy safes, bill receiving apparatus mounted on each said safe for receiving and validating bills of various denominations, for depositing validated bills in the safe, and for generating a signal proportionate to the denomination of each validated bill deposited in the safe, a control system in said intelligent safe including a CPU programmable for recognition of identification data, for carrying out selected functions in response to identification data, and for storing transactions data, data input means on each said safe accessible from the exterior of the safe for inputting identification data, means for connecting the bill receiving apparatus and the data input means on each of said economy safes with said control system, said control system upon receipt, recognition and processing of identification data accommodating in response to said data bill deposits into each said safe, access to each said safe and/or removal of bills from each said bill receiving apparatus, said control system recording and storing in memory each such transaction, and means for retrieving transactions data from said control system, said control system and said retrieving means accommodating selective preparation of reports by individual bill receiving apparatus, by selected bill receiving apparatuses and by all of said bill receiving apparatuses.

2. A system as set forth in claim 1, wherein said retrieving means comprises a printer mounted on said intelligent safe and coupled to said control system for printing and delivering to the exterior of said safe printed transactions data.

3. A system as set forth in claim 1, including a communications port mounted on said housing for access from the exterior of the housing and coupled to said control system for accommodating communication of transactions data from said control system to a remote accounting station or computer.

4. A system as set forth in claim 1, wherein said control system and said retrieving means accommodate selective preparation of any one or more of the following reports: an audit trail, bill deposits by user, bill deposits by denomination, total bill deposits, instances of access to said safe, instances of removal of bills from said bill receiving apparatus, chronological transactions by user, total chronological transactions, end of shift examine reports, zero reports, and end of the day balancing reports.

5. A paper currency deposit and validating safe comprising a generally box-like housing having walls forming a chamber comprising a safe for securing money, bill receiving apparatus mounted on said housing for receiving and validating bills of various denominations, for depositing validated bills in said safe, and for generating a signal proportionate to the denomination of each validated bill deposited in the safe, said bill receiving apparatus including a bill box removably mounted within said safe and means for stacking validated bills in said box, a control system in said safe including a CPU programmable for recognition of individual user identification data and authorization data, for carrying out selected functions in response to such identification and authorization data, and for storing transactions data, said control system including data input means on said housing accessible by individual users from the exterior of said safe for inputting to said system individual identification data and authorization data, said bill receiving apparatus being coupled to said control system for transmitting to said control system a signal proportionate to the denomination of each validated bill deposited in said safe by each individual user, said control system upon receipt, recognition and processing of identification and authorization data accommodating in response to said data one of the following functions: bill deposit, access to said safe, or removal and replacement of said bill box, said control system recording and storing in memory each such transaction and the identity of the individual who performed the transaction, means for retrieving transactions data from said control system, and a plurality of other bill receiving apparatuses coupled to said control system for transmitting to said control system for storage and subsequent retrieval a signal indicative of the denomination of each bill deposited in each said receiving apparatus, said control system and said retrieving means accommodating selective preparation of reports by individual bill receiving apparatus, by selected bill receiving apparatuses and by all of said bill receiving apparatuses.

6. A safe as set forth in claim 5, wherein said data input means comprises one or the other or both of smart card reading means and digital input means.

7. A safe as set forth in claim 5, wherein said retrieving means comprises a printer mounted on said housing and coupled to said control system for printing and delivering to the exterior of the housing printed transactions data.

8. A safe as set forth in claim 5, including a communications port mounted on said housing for access from the exterior of the housing and coupled to said control system for accommodating communication of transactions data from said control system to a remote accounting station or computer.

9. A paper currency deposit and validating safe comprising a generally box-like housing having walls forming a chamber comprising a safe for securing money, bill receiving apparatus mounted on said housing for receiving and validating bills of various denominations, for depositing a validated bills in said safe, and for generating a signal proportionate to the denomination of each validated bill deposited in the safe, said bill receiving apparatus including a bill box within said safe and means for stacking bills in said box, a control system in said safe including a CPU programmable for recognition of individual user identification and authorization data for carrying out selected functions in response to such identification and authorization data, and for storing transactions data, said control system including data input means on said housing accessible by individual users from the exterior of said safe for inputting to said system individual identification data and authorization data, said bill receiving apparatus being coupled to said control system for transmitting to said control system a signal proportionate to the denomination of each validated bill deposited in said safe by each individual user, said control system upon receipt, recognition and processing of identification and authorization data accommodating in response to said data one of the following functions: bill deposit, access to said safe, or removal and replacement of said bill box, said control system recording and storing in memory each such transaction and the identity of the individual who performed the transaction, and means for retrieving transactions data from said control system, said control system and said retrieving means accommodating selective preparation of any one or more of the following reports: an audit trail, bill deposits by user, bill deposits by denomination, total bill deposits, instances of access to said safe, instances of removal or handling of said bill box, chronological transactions by user, total chronological transactions, end of shift examine reports by user, zero reports, and end of the day balancing reports, said safe including a plurality of said bill receiving apparatuses coupled to said control system for transmitting to said control system for storage and subsequent retrieval a signal indicative of the denomination of each bill deposited in each said receiving apparatus, said control system and said retrieving means accommodating selective preparation of said reports by individual bill receiving apparatus, by selected bill receiving apparatuses and by all of said bill receiving apparatuses.

* * * * *